(12) United States Patent
Rising et al.

(10) Patent No.: US 7,471,825 B2
(45) Date of Patent: Dec. 30, 2008

(54) SYSTEM AND METHOD FOR UTILIZING A GRAPHIC EQUALIZER IN PERFORMING IMAGE SEARCH PROCEDURES

(75) Inventors: Hawley K. Rising, San Jose, CA (US); Jeff Valle, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 695 days.

(21) Appl. No.: 11/196,862

(22) Filed: Aug. 4, 2005

(65) Prior Publication Data

US 2007/0031034 A1 Feb. 8, 2007

(51) Int. Cl.
*G06K 9/00* (2006.01)

(52) U.S. Cl. .................................................. 382/168

(58) Field of Classification Search ................. 382/155, 382/159, 165, 168–172, 181, 190, 192, 194, 382/218–219, 224–225, 305; 706/18, 20, 706/25, 934; 707/1, 3–5, 10, 104.1
See application file for complete search history.

(56) References Cited

U.S. PATENT DOCUMENTS 6,181,818 B1 * 1/2001 Sato et al. ................... 382/170
6,445,818 B1 9/2002 Kim et al.
6,584,223 B1 6/2003 Shiiyama
7,206,779 B2 * 4/2007 Furuhashi et al. ............. 707/5
7,310,630 B2 * 12/2007 Furuhashi et al. ............. 707/3

* cited by examiner

*Primary Examiner*—Jose L Couso
(74) *Attorney, Agent, or Firm*—Gregory J. Koerner; Redwood Patent Law

(57) ABSTRACT

A system and method for utilizing a graphic equalizer in performing image search procedures includes a histogram calculator for creating sets of histograms that represent corresponding images. A graphic equalizer is configured to select weighting parameters for performing the image search procedure. A feature detector calculates distance measures between histogram comparison pairs of a query image and subject images. The feature detector applies the weighting parameters to the distance measures to produce weighted distance measures. The feature detector next combines the weighted distance measures from the histogram comparison pairs to produce a composite distance measure for each of the subject images. The feature detector may then identify one or more of the subject images that are similar to the query image by analyzing the composite distance measures.

20 Claims, 10 Drawing Sheets

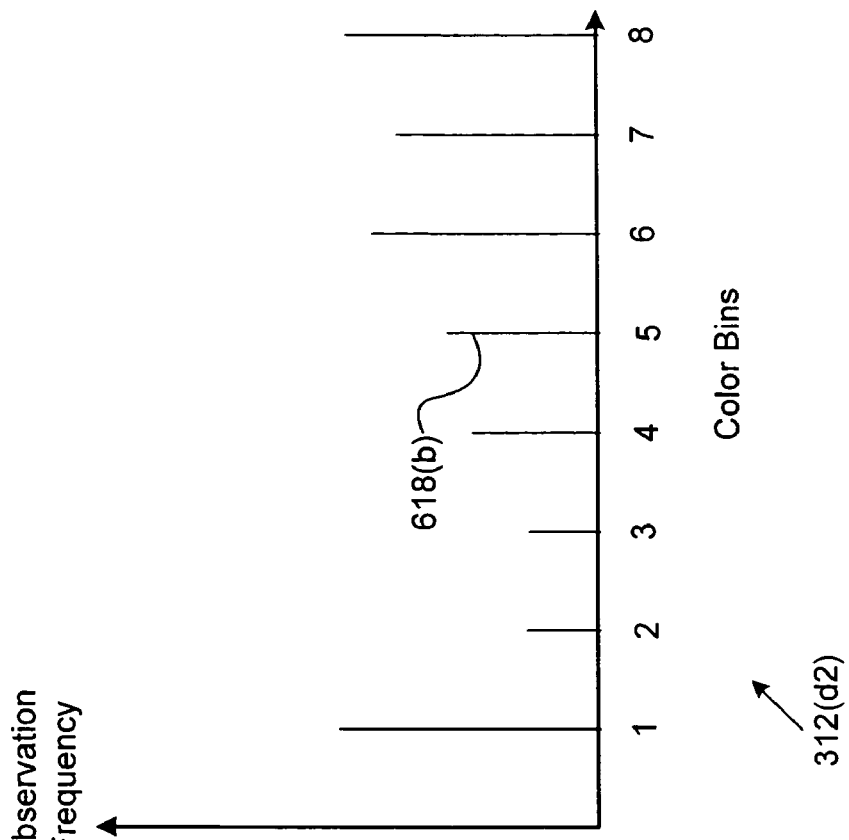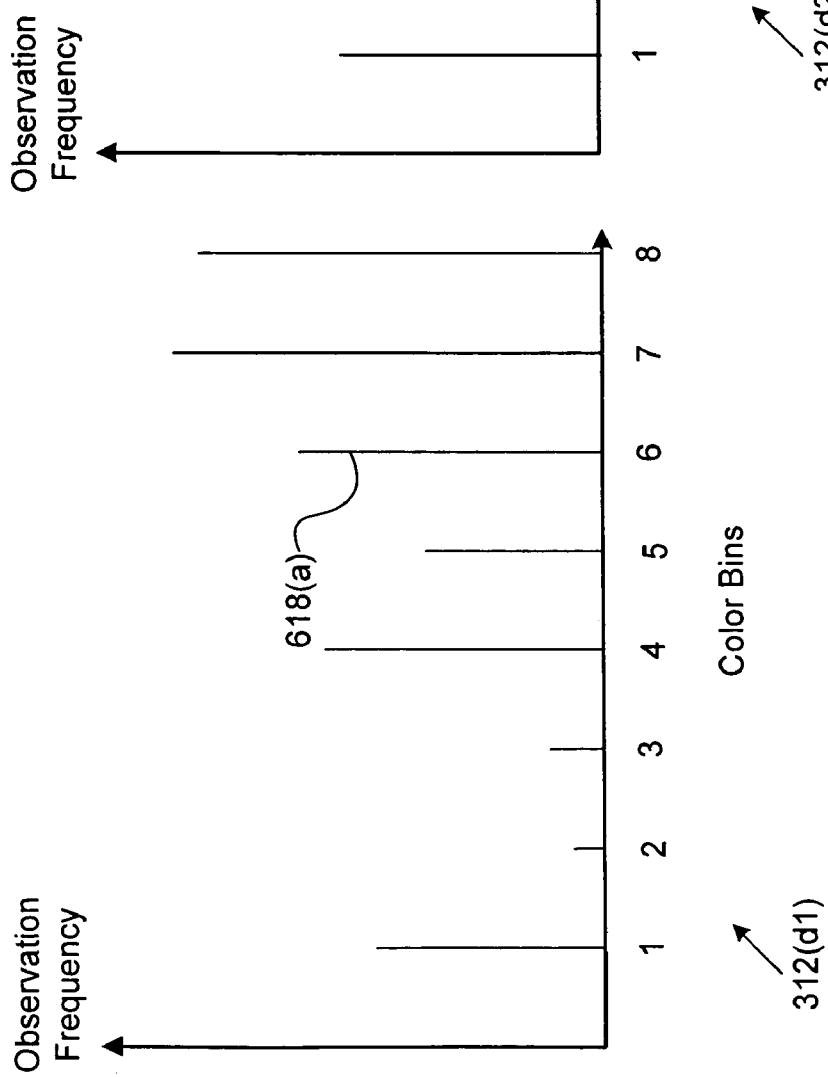

SYSTEM AND METHOD FOR UTILIZING A GRAPHIC EQUALIZER IN PERFORMING IMAGE SEARCH PROCEDURES

BACKGROUND SECTION

1. Field of Invention

This invention relates generally to techniques for analyzing information, and relates more particularly to a system and method for utilizing a graphic equalizer in performing image search procedures.

2. Description of the Background Art

Implementing effective methods for analyzing information is a significant consideration for designers and manufacturers of contemporary electronic devices. However, effectively analyzing information with electronic devices may create substantial challenges for system designers. For example, enhanced demands for increased device functionality and performance may require more system processing power and require additional hardware resources. An increase in processing or hardware requirements may also result in a corresponding detrimental economic impact due to increased production costs and operational inefficiencies.

Furthermore, enhanced device capability to perform various advanced operations may provide additional benefits to a system user, but may also place increased demands on the control and management of various device components. For example, an enhanced electronic device that effectively analyzes and manipulates digital image data may benefit from an efficient implementation because of the large amount and complexity of the digital data involved.

Due to growing demands on system resources and substantially increasing data magnitudes, it is apparent that developing new techniques for analyzing information is a matter of concern for related electronic technologies. Therefore, for all the foregoing reasons, developing effective systems for analyzing information remains a significant consideration for designers, manufacturers, and users of contemporary electronic devices.

SUMMARY

In accordance with the present invention, a system and method are disclosed for utilizing a graphic equalizer in performing image search procedures. In one embodiment, a histogram calculator of a computer device initially creates a set of color histograms for each image of saved image data. In certain embodiments, the color histograms include a fine-detail histogram, a medium-fine detail histogram, a medium-coarse detail histogram, and a coarse-detail histogram.

Next, a system user or other appropriate entity selects a query image for which image data has been saved, for performing an image search procedure, identifying one or more other similar subject images from the image data. A graphic equalizer is utilized to set weighting parameters corresponding to each type of color histogram for performing the image search procedure. The foregoing weighting parameters may be selected automatically depending upon predetermined search criteria, or may be selected manually by the system user or other appropriate entity.

A feature detector of the computer device applies the foregoing weighting parameters to calculated distance measures for each of the types of color histograms to generate corresponding weighted distance measures. In certain embodiments, the foregoing distance measures may be based upon calculated Hausdorff distances. The feature detector combines the weighted distance measures to generate composite distance measures that each correspond to a respective one of the subject images. Finally, the feature detector may analyze the calculated composite distance measures to identify one or more images from the image data that are most similar to the selected query image of the image search procedure. For at least the foregoing reasons, the present invention provides an improved system and method, utilizing a graphic equalizer in performing image search procedures.

BRIEF DESCRIPTION OF THE DRAWINGS

FIGS. 6A and 6B are a histogram comparison pair for illustrating a Hausdorff distance calculation procedure, in accordance with one embodiment of the present invention;

DETAILED DESCRIPTION

The present invention relates to an improvement in information analysis techniques. The following description is presented to enable one of ordinary skill in the art to make and use the invention and is provided in the context of a patent application and its requirements. Various modifications to the disclosed embodiments will be readily apparent to those skilled in the art and the generic principles herein may be applied to other embodiments. Thus, the present invention is not intended to be limited to the embodiments shown, but is to be accorded the widest scope consistent with the principles and features described herein.

The present invention comprises a system and method for utilizing a graphic equalizer in performing image search procedures, and includes a histogram calculator for creating sets of histograms that represent corresponding images. A graphic equalizer is configured to select weighting parameters for performing the image search procedure. A feature detector calculates distance measures between histogram comparison pairs of a query image and subject images. The feature detector applies the weighting parameters to the distance measures to produce weighted distance measures. The feature detector next combines the weighted distance measures from the histogram comparison pairs to produce a composite distance measure for each of the subject images. The feature detector may then identify one or more of the subject images that are similar to the query image by analyzing the composite distance measures.

Figure 1:
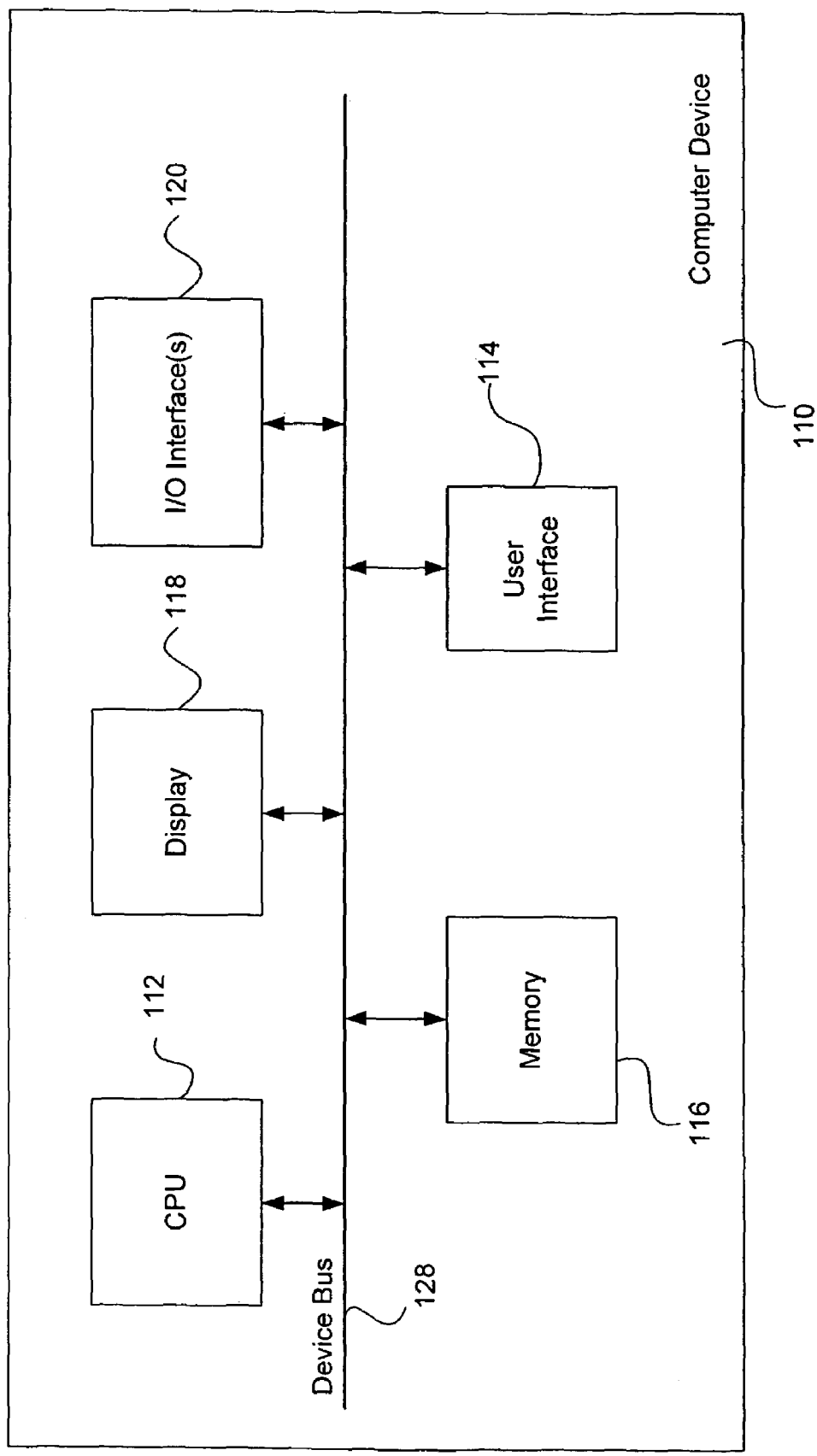
FIG. 1 is a block diagram for one embodiment of a computer device, in accordance with the present invention.

Referring now to FIG. 1, a block diagram for one embodiment of a computer device 110 is shown, in accordance with the present invention. In the FIG. 1 embodiment, computer device 110 includes, but is not limited to, a central processing unit (CPU) 112, a user interface 114, memory 116, a display 118, and input/output interface(s) (I/O interface(s)) 120. The foregoing components of computer device 110 may be coupled to, and communicate through, a device bus 128.

In alternate embodiments, computer device 110 may readily be implemented using components and configurations in addition to, or instead of, certain of those components and configurations discussed in conjunction with the FIG. 1 embodiment. Furthermore, the present invention may readily be performed by various types of electronic devices other than computer device 110.

In the FIG. 1 embodiment, CPU 112 may be implemented to include any appropriate and compatible microprocessor device that preferably executes software instructions to control and manage the operation of image manager 110. The FIG. 1 display 118 may include any effective type of display technology including a cathode-ray-tube monitor or a liquid-crystal display device. In the FIG. 1 embodiment, I/O interface(s) 120 may include one or more input and/or output interfaces to receive and/or transmit any required types of information by computer device 110.

In the FIG. 1 embodiment, memory 116 may include any combination of desired storage devices, including, but not limited to, read-only memory (ROM), random-access memory (RAM), and various types of non-volatile memory, such as floppy disks or hard disks. The contents and functionality of memory 116 are further discussed below in conjunction with FIGS. 2 and 3.

Figure 2:
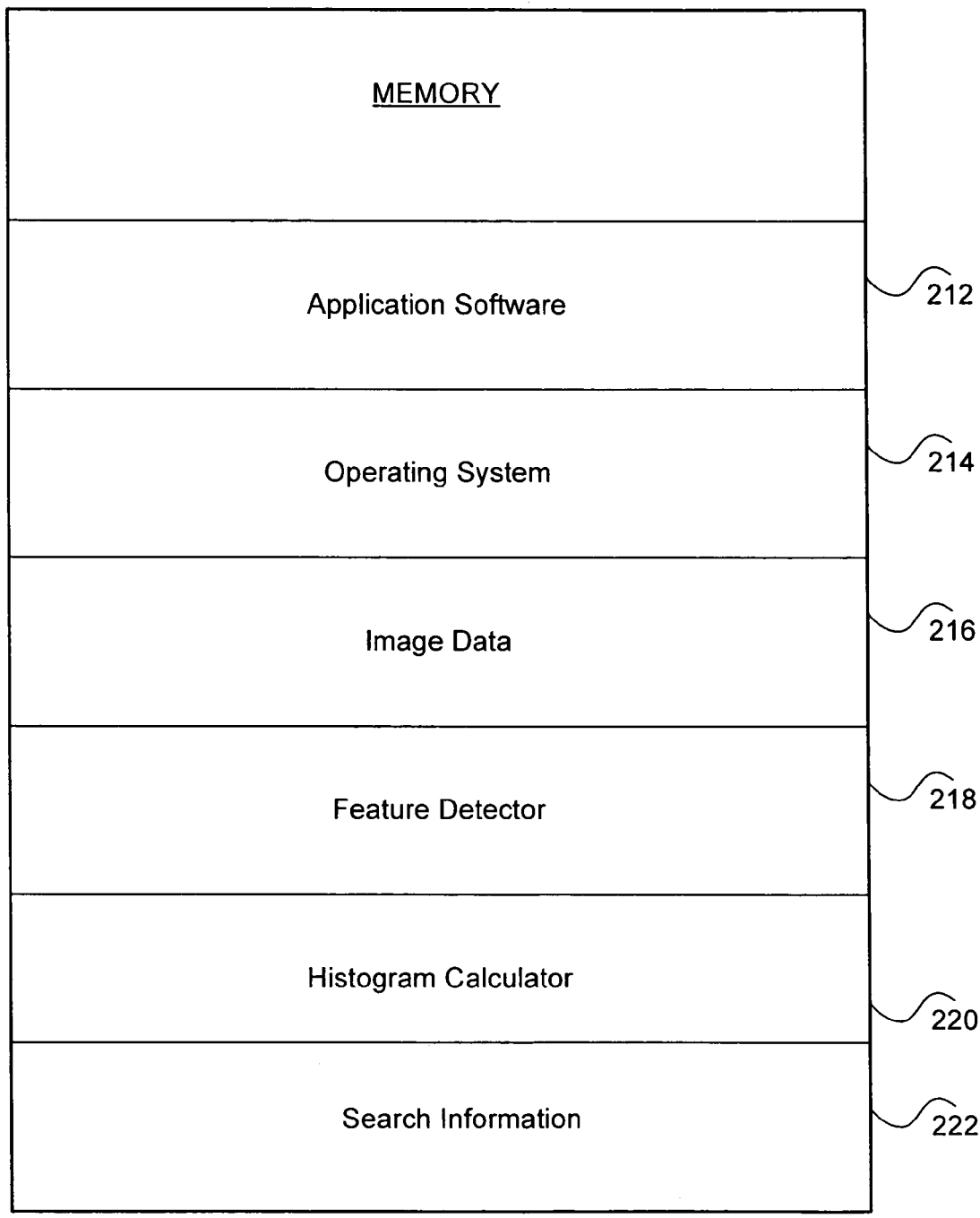
FIG. 2 is a block diagram for one embodiment of the memory of FIG. 1, in accordance with the present invention.

Referring now to FIG. 2, a block diagram for one embodiment of the FIG. 1 memory 116 is shown, in accordance with the present invention. In the FIG. 2 embodiment, memory 116 includes, but is not limited to, application software 212, an operating system 214, image data 216, a feature detector 218, a histogram calculator 220, and search information 222. In alternate embodiments, memory 116 may readily include other components in addition to, or instead of, certain of those components discussed in conjunction with the FIG. 2 embodiment.

In the FIG. 2 embodiment, application software 212 may include program instructions that are executed by CPU 112 (FIG. 1) to perform various functions and operations for computer device 110. The nature and functionality of application software 212 may vary depending upon factors such as the specific type and particular use of the corresponding computer device 110. In the FIG. 2 embodiment, operating system 214 controls and coordinates low-level functionality of image manager 110.

Image data 216 includes various types of data that is stored in memory 116. Image data 216 may include captured images or other types of information. For example, in certain embodiments, image data 216 may include one or more images that a system user obtains from an external source such as a camera device or the Internet. In alternate embodiments, the present invention may readily be utilized to analyze data other than the image data 216 shown in FIG. 2.

In the FIG. 2 embodiment, feature detector 218 may be utilized to calculate and analyze search information 222 to thereby perform image search procedures. Histogram calculator 220 may be utilized to generate corresponding histograms relating to image data 216. One embodiment for search information 222 is further discussed below in conjunction with FIG. 3. Furthermore, the utilization of feature detector to analyze search information 222 is further discussed below in conjunction with FIGS. 4 through 8B.

Figure 3:
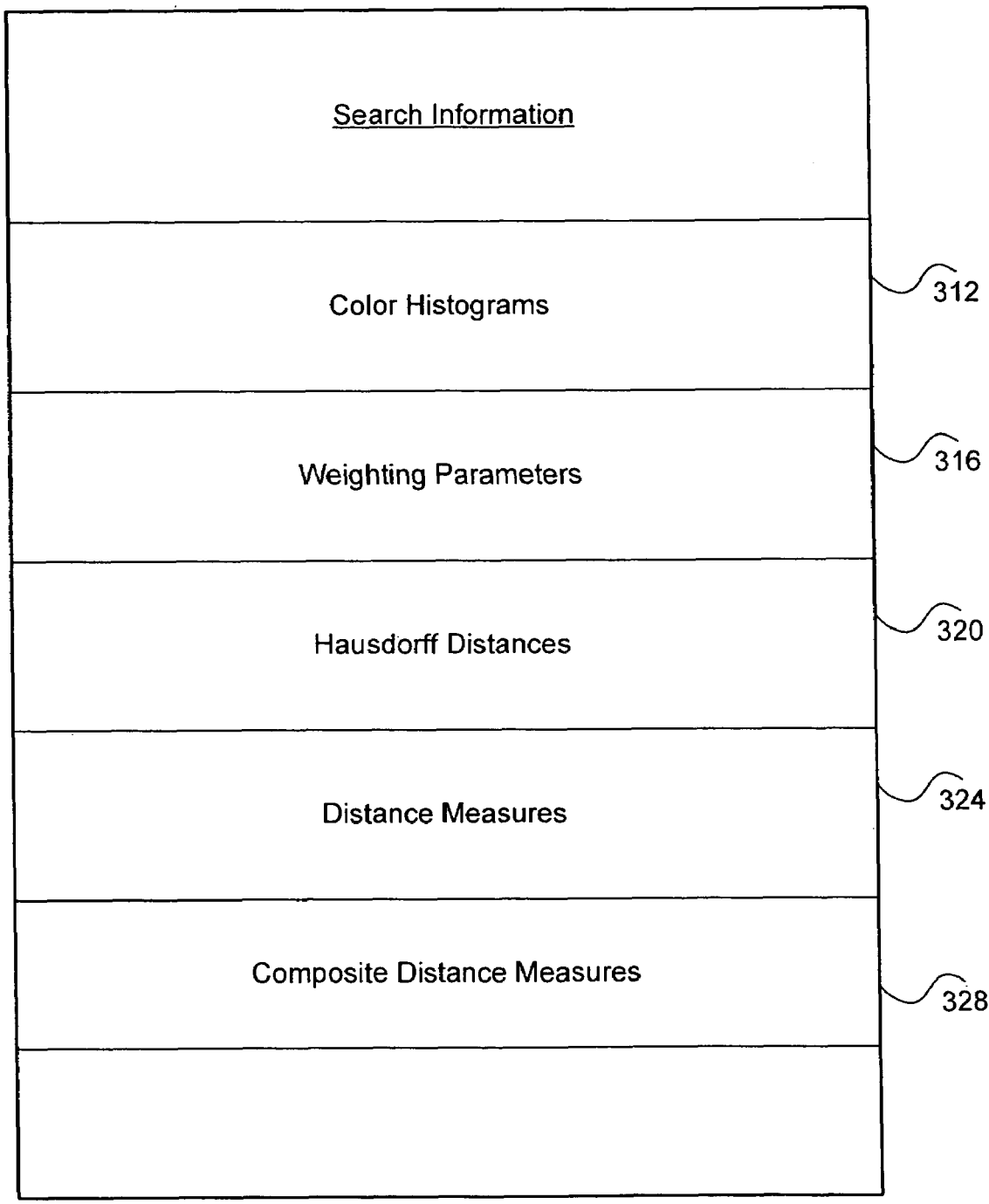
FIG. 3 is a block diagram for one embodiment of the search information of FIG. 2, in accordance with the present invention.

Referring now to FIG. 3, a block diagram for one embodiment of the FIG. 2 search information 222 is shown, in accordance with the FIG. 2 present invention. In the FIG. 3 embodiment, search information 222 may include, but is not limited to, color histograms 312, weighting parameters 316, Hausdorff distances 320, distance measures 324, and composite distance measures 328. In alternate embodiments, search information 222 may readily include other components in addition to, or instead of, certain of those components discussed in conjunction with the FIG. 3 embodiment. The generation and utilization of search information 222 by feature detector 218 (FIG. 2) is further discussed below in conjunction with FIGS. 4 through 8B.

Referring now to FIGS. 4A through 4D, diagrams of four color histograms 312 are shown, in accordance with one embodiment of the present invention. The FIG. 4 embodiment is presented for purposes of illustration, and in alternate embodiments, the present invention may readily include various other techniques and elements, in addition to, or instead of, those techniques and elements discussed in conjunction with the FIG. 4 embodiment. For example, in alternate embodiments, the present invention may be practiced with a different number of histograms 312 that include a different number of respective bins than those shown in FIGS. 4A through 4D.

Figure 4A:
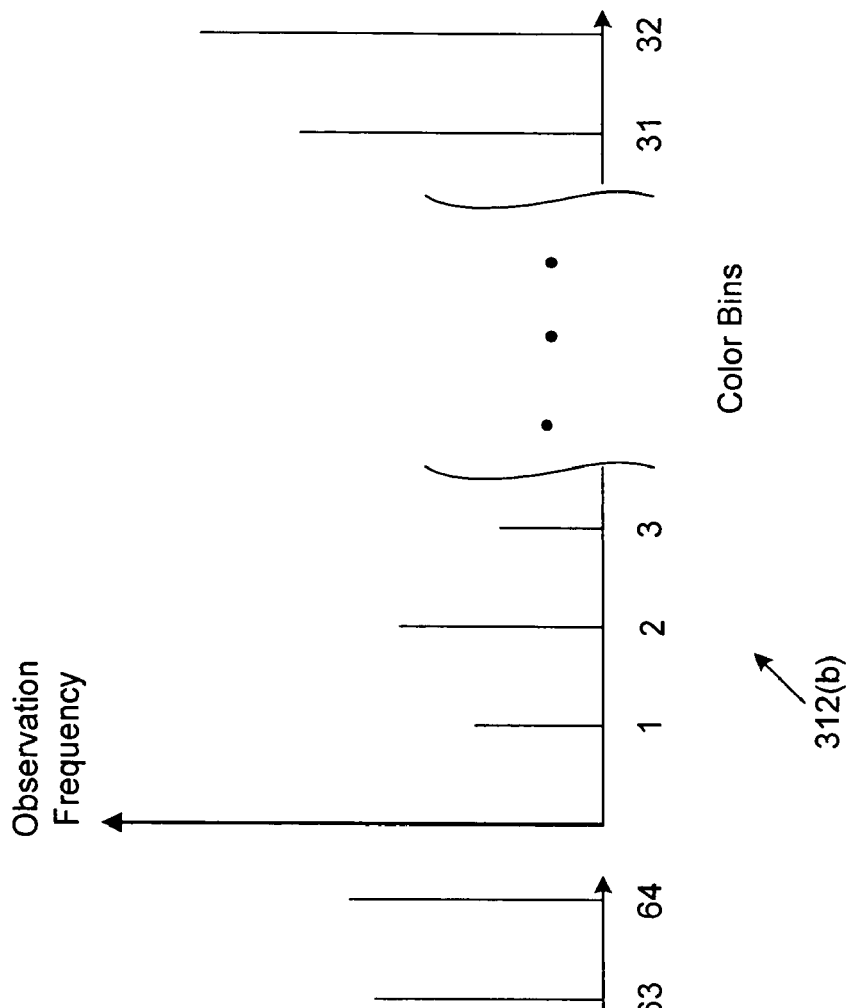
FIGS. 4A through 4D are diagrams of color histograms, in accordance with one embodiment of the present invention.

FIG. 4A shows a fine detail histogram 312(a) that includes a horizontal axis with sixty-four bins that represent the prominent colors in a given image 216 with a relatively fine degree of detail. In the FIG. 4A embodiment, the observation frequencies of the respective colors in image 216 are represented by the amplitudes of the color bins displayed on a vertical axis of fine detail histogram 312(a). In certain embodiments, fine detail histogram 312(a) may be constructed by histogram calculator 220 (FIG. 2) as an adaptive histogram by analyzing color characteristics of a corresponding image 216.

Figure 4B:
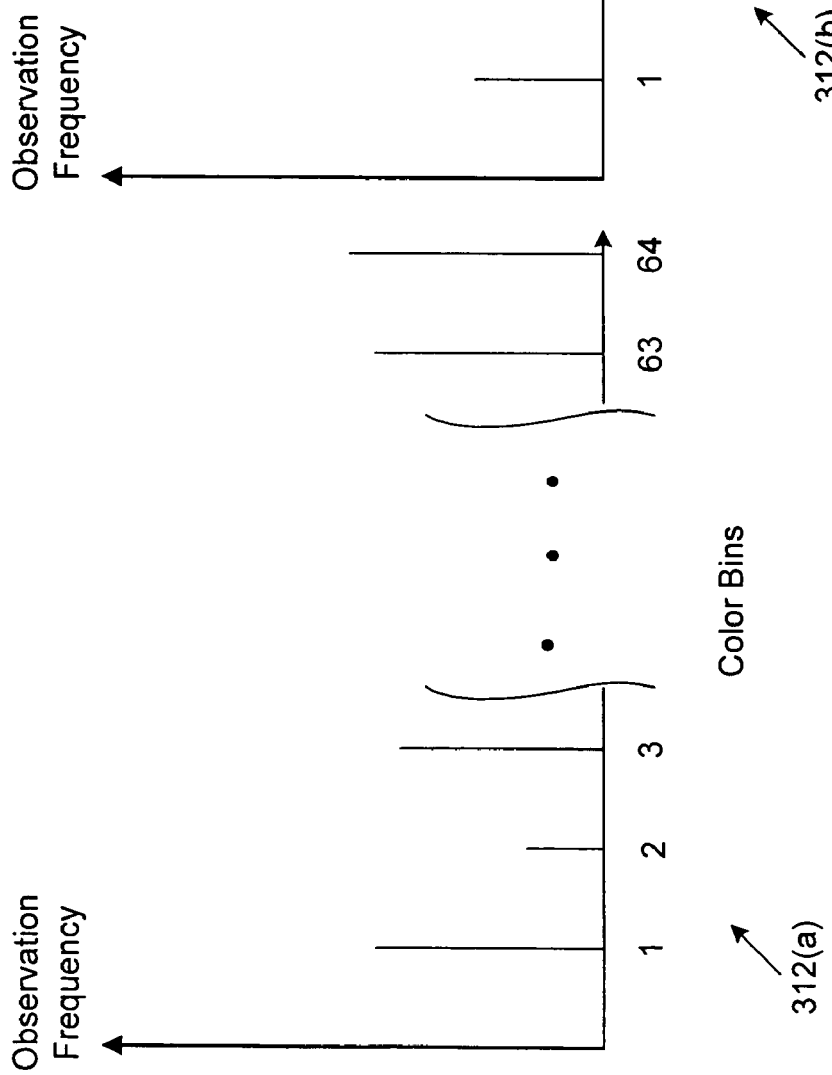

FIG. 4B shows a medium-fine detail histogram 312(b) that includes a horizontal axis with thirty-two bins that represent the prominent colors in a given image 216 with a medium-fine degree of detail. In the FIG. 4B embodiment, the observation frequencies of the respective colors in image 216 are represented by the amplitudes of the color bins displayed on a vertical axis of medium-fine detail histogram 312(b). In certain embodiments, medium-fine detail histogram 312(b) may be constructed by histogram calculator 220 (FIG. 2) as an adaptive histogram by analyzing color characteristics of a corresponding image 216.

Figure 4D:
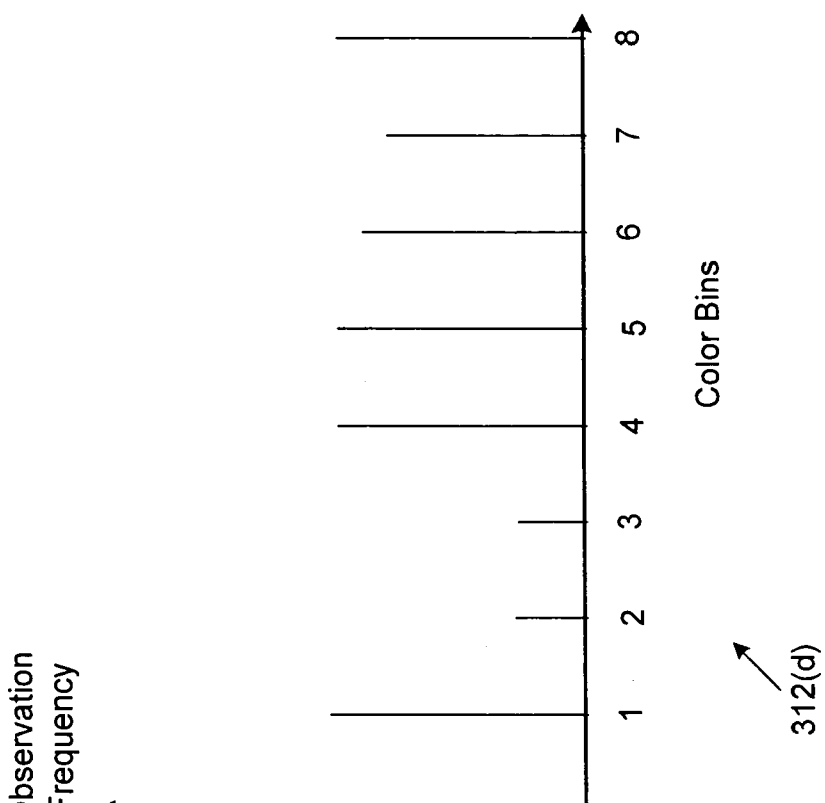
Figure 4C:
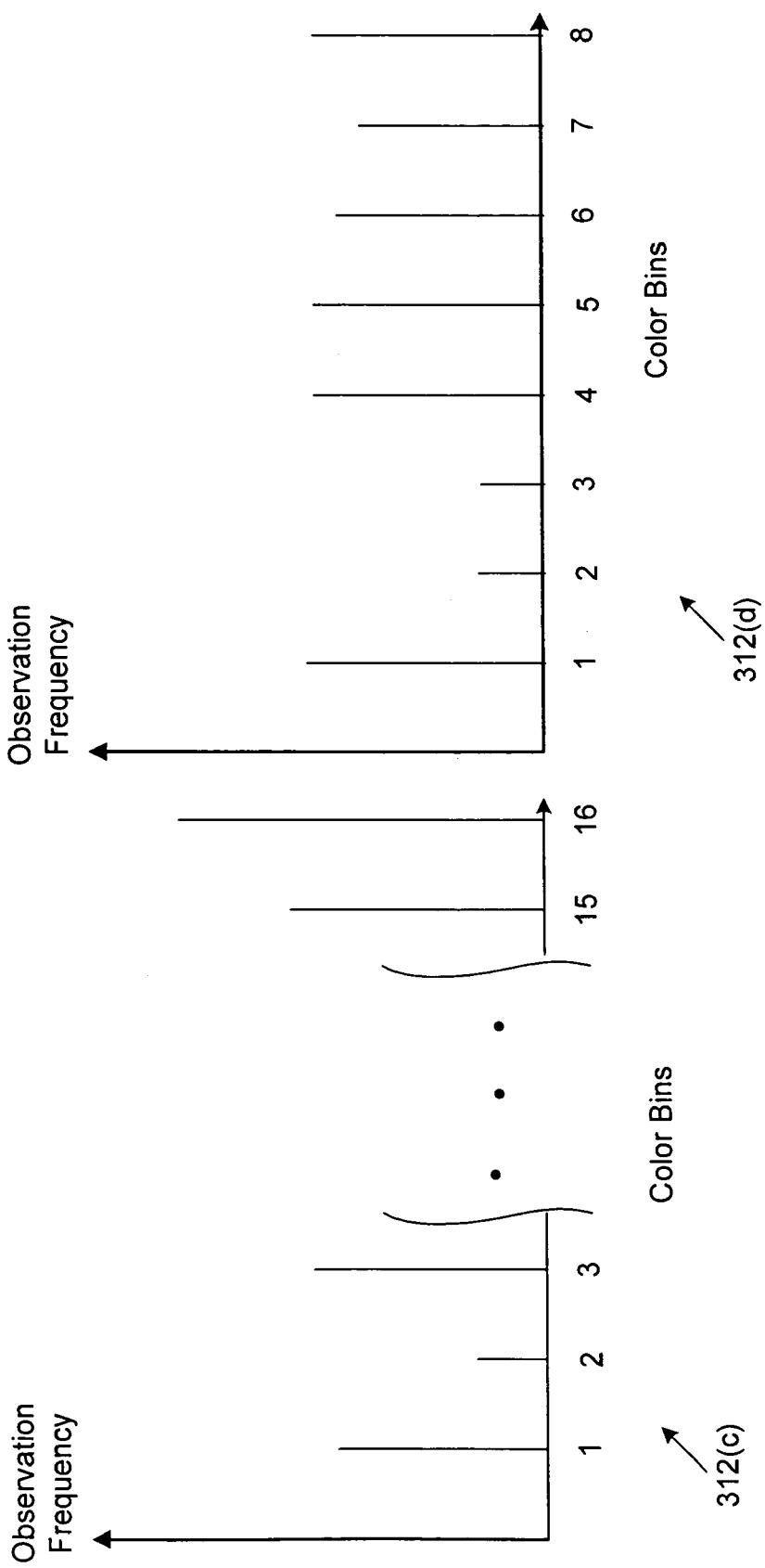

FIG. 4C shows a medium-coarse detail histogram 312(c) that includes a horizontal axis with sixteen bins that represent the prominent colors in a given image 216 with a medium-coarse degree of detail. In the FIG. 4B embodiment, the observation frequencies of the respective colors in image 216 are represented by the amplitudes of the color bins displayed on a vertical axis of medium-coarse detail histogram 312(c). In certain embodiments, medium-coarse detail histogram 312(c) may be constructed by histogram calculator 220 (FIG. 2) as an adaptive histogram by analyzing color characteristics of a corresponding image 216.

FIG. 4D shows a coarse detail histogram 312(d) that includes a horizontal axis with eight bins that represent the prominent colors in a given image 216 with a relatively coarse degree of detail. In the FIG. 4D embodiment, the observation frequencies of the respective colors in image 216 are represented by the amplitudes of the color bins displayed on a vertical axis of coarse detail histogram 312(d). In certain embodiments, coarse detail histogram 312(d) may be constructed by histogram calculator 220 (FIG. 2) as an adaptive histogram by analyzing color characteristics of a corresponding image 216. For purposes of illustration, the FIG. 4 histograms 312 are shown with 64 bins, 32 bins, 16 bins, and 8 bins. However, in other embodiments, any other appropriate number of bins may be utilized. The utilization of color histograms 312 in conjunction with a graphic equalizer is further discussed below in conjunction with FIGS. 5-8B.

Figure 5:
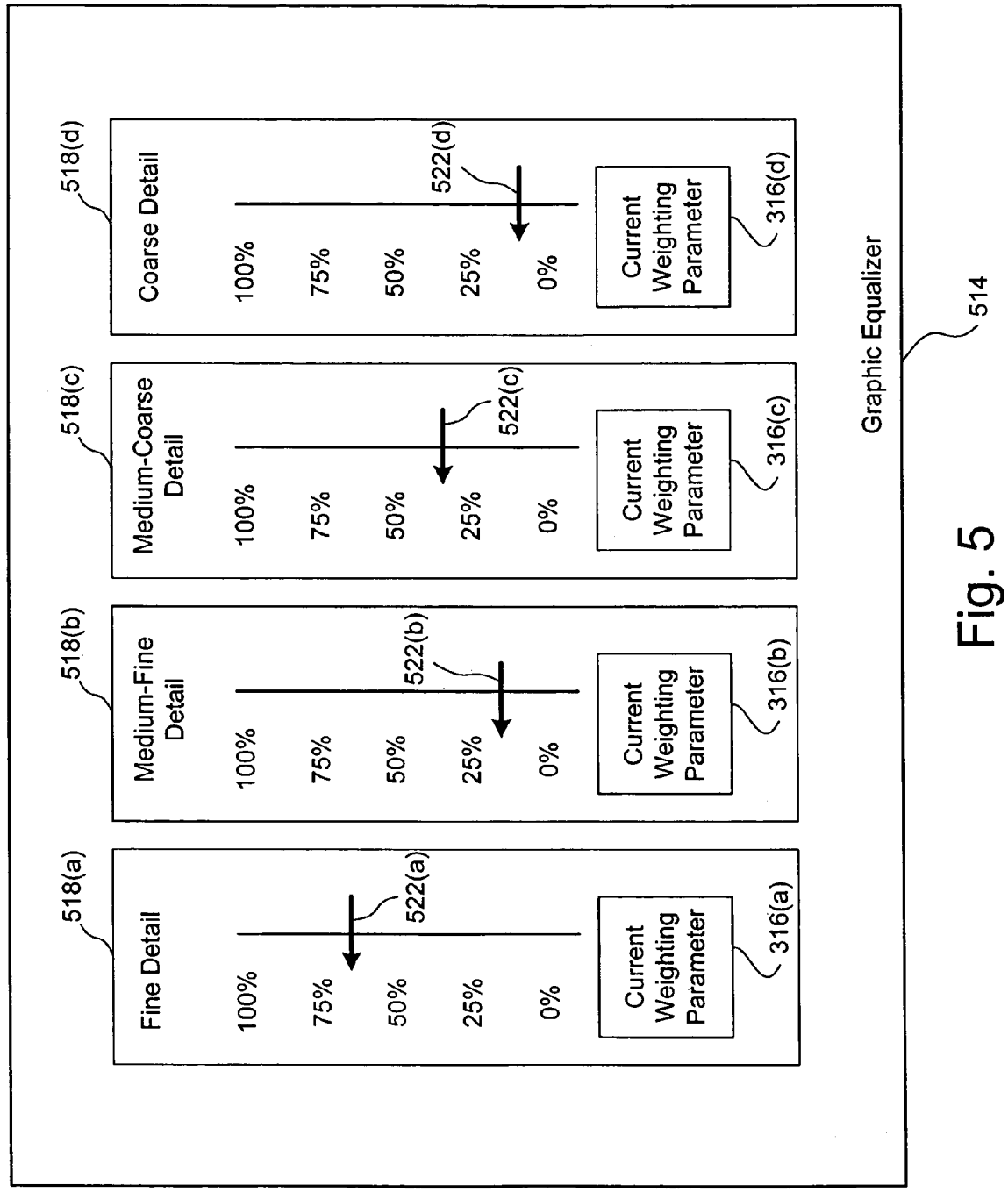
FIG. 5 is a diagram illustrating a graphic equalizer, in accordance with one embodiment of the present invention.

Referring now to FIG. 5, a diagram of a graphic equalizer 514 is shown, in accordance with one embodiment of the present invention. The FIG. 5 embodiment is presented for purposes of illustration, and in alternate embodiments, the present invention may readily utilize graphic equalizers with elements and configurations, in addition to, or instead of, certain of those elements and configurations discussed in conjunction with the FIG. 5 embodiment.

In accordance with the present invention, graphic equalizer 514 allows adjustment of the level of detail for images 216 in an image search procedure that uses content-based image retrieval techniques. In certain embodiments, graphic equalizer 514 utilizes a combination of two types of distance calculations, a known Earth Mover's Distance (EMD) that is usually used on statistical image information, and a known Hausdorff distance that is usually used to calculate the distance between sets (in this case, color histograms of two images).

Using the relationship between the EMD and the Hausdorff distance, images 216 are each first described with a set of color histograms 312 varying from many bins to few bins, as discussed above in conjunction with FIGS. 4A through 4D. The color histograms 312 with many bins contain descriptions of image colors at a finer level of detail than those with few bins. In accordance with the present invention, the Hausdorff distance is utilized to compare the fine detail color histograms 312($a$).

In addition, several iterations of the Hausdorff distance are utilized to compare on the medium-detail color histograms 312($b$) and 312($d$). The full EMD is utilized on the coarse-detail color histograms 312($d$) with relatively few bins. Calculating all the successive Hausdorff distances between two coarse-detail color histograms 312($d$), multiplied by the weight of the smaller bin for each, results in the EMD. This relationship between the Hausdorff distance calculations and the EMD provides a continuum in description because the distance measures represent a selectable number of color histograms 312 that range from fine detail to coarse detail.

In practice, when calculating a Hausdorff distance for the finer-detailed color histograms 312, the two corresponding bins are identified (one in each color histogram of a histogram pair currently being compared) that have the furthest distance, i.e. the greatest novelty. Therefore, the Hausdorff distance locates relatively smaller objects in an image 216 that are dissimilar. Performing additional iterations of the Hausdorff distance calculations compares more and more of histograms for the medium-detail color histograms 312.

Finally, for the coarsest histogram 312($d$), we use all 2n–2 Hausdorff distances (where "n" is the total number of bins from a color histogram 312) to match up all the color bins, but on a very coarse scale. This final coarse distance measure looks for larger parts of the image 216 (the sky, trees, backgrounds, etc.) and indicates the similarity in the larger parts of the images 216. Consequently by using linear combinations of all the various detail levels of histograms 312, the present invention creates composite distance measures that fit the various objects and their different scales in the image 216.

The present invention thus supports image search procedures that combine search results from relatively fine (many colored) color histograms 312 with search results from relatively coarse histograms 312. The present invention thus provides search results that consider both coarse and fine detail information. Furthermore, the present invention also takes into account the differences between utilizing novelty filters for image comparison (showing how much two images are different), and using graphical matches (which look for similar image parts).

The Hausdorff distance may defined as follows: Given points "a" in set A, and points "b" in set B, choose a point "a", and find the smallest distance from that point "a" to any point "b" in set B. Successively choosing each point "a" in set A, the maximum of these distances is designated as h(A, B). For symmetry, a similar process is performed with each point "b" in set B to yield h(B, A). Note that, in general, h(A, B) is not equal to h(B, A). The maximum of h(A, B) and h(B, A) is the Hausdorff distance, and is usually written H(A,B). A further discussion of the Hausdorff distance may be found on the Internet at the following address: http://en.wikipedia.org/wiki/Hausdorff distance.

The EMD procedure for comparing any two color histograms 312 may be described as follows: Analogize a set A (bins in a first histogram 312) to piles of earth of various sizes, and analogize a set B (bins in a second histogram 312) to holes of various sizes. The EMD may then be calculated as the least amount of total work required to move the "earth" into the "holes". The EMD may therefore be defined as the amount of earth moved times the distance that the earth is moved. The EMD is further discussed in "A Metric For Distributions With Applications To Image Databases," by Rubner, Y., Tomasi, C., and Guibas, L. J., Computer Vision, 1998, Sixth International Conference on Computer Vision on 4-7 Jan. 1998, pages 59-66.

It turns out that if successive Hausdorff distances are calculated between two color histograms 312, each time removing the lesser of the two points whose distance is equal to H(A, B), and then all of up to 2n–2 of these successive Hausdorff distances are summed, the EMD for that histogram pair is found. So if there is a collection of set pairs (Ai, Bi) for 1=1 to I=N, then different values for each "i" may be determined by using partial sums of Hausdorff distances, or by using the complete sums which are also the EMDs. Because the Hausdorff distance at each point is the point-to-set distance that is the largest, individual Hausdorff distance measures novelty. In contrast, because the EMD finds the most efficient way to measure and combine distances into work done, the EMD measures commonality.

In accordance with the present invention, graphic equalizer 514 operates by applying weighting parameters 316 to successively more complete sets of distance measures, starting at fine detail histograms 312($a$) of the corresponding images 216, and proceeding through several medium-detail histograms 312($b$) and 312($c$), to coarse detail histograms 312($d$) of the images 216. A feature detector 218 (FIG. 2) sums these up weighted distance measures in a linear combination according to the weight controls 522 on graphic equalizer 514. The weighting parameters 316 may be automatically or manually set to indicate how the image attributes embodied in the various histograms 312 should be interpreted.

The present invention may also be utilized upon various other image characteristics. For example, if used on texture characteristics, it would essentially tell whether the image textures should be compared for the greatest discrepancies in texture, or whether the textures should be matched at all levels. It could also be used to set granularity and detail for replication and non-linear image editing. The present invention may also be applied to other forms of visual or audio multimedia.

In certain embodiments, color histograms 312 may be taken from images in L*a*b* space. As discussed above in conjunction with FIGS. 4A through 4D, color histograms 312 with 64, 32, 16, and 8 bins may be utilized. In certain embodiments, one Hausdorff distance is computed for the fine-detail histograms 312(a), two Hausdorff distances are computed and combined for the medium-fine detail histograms 312(b). In addition, four Hausdorff distances are computed and combined for the medium-coarse detail histograms 312(c), and finally, 8*2−2 (or all fourteen) of the Hausdorff distances are computed and combined for the coarse-detail histograms 312(d), making this final set of calculations a complete EMD. In certain embodiments, the present invention may operate upon color histograms from images of different sizes. In addition, an implementation that performs only a one-way Hausdorff distance h(A, B) for matching a sub-image to a whole or larger image may be utilized.

In the FIG. 5 embodiment, graphic equalizer 514 may be presented upon display 118 (FIG. 1) for viewing by a system user. In alternate embodiments, graphic equalizer 514 need not be displayed, however, similar weighting functionality may be controlled in any appropriate manner. In the FIG. 5 embodiment, graphic equalizer 514 includes four weighting parameter modules 518. A weighting control 522(a) of a fine-detail weighting parameter module 518(a) may be adjusted to select a current weighting parameter 316(a) for applying to a distance measure 324 corresponding to comparison pairs of fine detail histograms 312(a) (FIG. 4A) during an image search procedure.

Similarly, a weighting control 522(b) of a medium-fine detail weighting parameter module 518(b) may be adjusted to select a current weighting parameter 316(b) for applying to a distance measure 324 corresponding to comparison pairs of medium-fine detail histograms 312(b) (FIG. 4B) during the image search procedure. In addition, a weighting control 522(c) of a medium-coarse detail weighting parameter module 518(c) may be adjusted to select a current weighting parameter 316(c) for applying to a distance measure 324 corresponding to comparison pairs of medium-coarse detail histograms 312(c) (FIG. 4C) during the image search procedure. Finally, a weighting control 522(d) of a coarse-detail weighting parameter module 518(d) may be adjusted to select a current weighting parameter 316(d) for applying to a distance measure 324 corresponding to comparison pairs of coarse-detail histograms 312(d) (FIG. 4D) during the image search procedure.

In accordance with the present invention, a feature detector 218 (FIG. 2) may coordinate the image search procedure by initially calculating distance measures 324 that quantify the correlation between histogram comparison pairs (between histograms 312 for a selected query image and corresponding histograms 312 for the other subject images 216). Feature detector 218 then applies the foregoing weighting parameters 316 to the respective distance measures 324 to produce weighted distance measures for each comparison pair.

For example, a fine-detail weighting parameter 316(a) is applied to comparison pairs of fine detail histograms 312(a) (FIG. 4A), and a medium-fine detail weighting parameter 316(b) is applied to comparison pairs of medium-fine detail histograms 312(b) (FIG. 4B). Similarly, a medium-coarse detail weighting parameter 316(c) is applied to comparison pairs of medium-coarse detail histograms 312(c) (FIG. 4C), and a coarse-detail weighting parameter 316(d) is applied to comparison pairs of coarse-detail histograms 312(d) (FIG. 4D).

Feature detector 218 may then combine the weighted distance measures for each image 216 to produce corresponding composite distance measures 328 that reflect the weighted contributions of each of the four color histograms 312 for each image 216. Feature detector 218 may then identify those images 216 that are most similar to the selected query image by evaluating the range of composite distance measures 328. For at least the foregoing reasons, the present invention provides an improved system and method for utilizing a graphic equalizer 514 in performing image search procedures.

Referring now to FIGS. 6A and 6B, a histogram comparison pair are shown for illustrating an iteration technique for Hausdorff distance calculation procedures, in accordance with one embodiment of the present invention. The embodiments of FIGS. 6A and 6B are presented for purposes of illustration, and in alternate embodiments, the present invention may readily include techniques and elements, in addition to, or instead of, certain of those techniques and elements discussed in conjunction with the embodiments of FIGS. 6A and 6B. For example, in alternate embodiments, the observation frequency and number of color bins represented may differ from those shown in the example of FIGS. 6A and 6B.

In FIGS. 6A and 6B, histograms 312(d1) and 312(d2) form a histogram comparison pair for calculating a corresponding distance measure 324, as discussed above. In the FIG. 6A example, histogram 312(d1) is shown as a coarse detail histogram (see FIG. 4D) that may correspond to a query image for an image search procedure. In addition, in the FIG. 6B example, histogram 312(d2) is also shown as a coarse detail histogram that corresponds to one of the comparison subject images 216 for the image search procedure.

In the FIG. 6 example, feature detector 218 calculates a Hausdorff distance 320 (FIG. 3) for the histogram comparison pair. For the sake of illustration, let us assume that the Hausdorff distance 320 corresponds to color bin 618(a) and color bin 618(b). If another iteration of the Hausdorff distance needs to be calculated (depending upon a predetermined iteration limit value selected for the particular histogram comparison pair), then both color bin 618(a) and color bin 618(b) are first reduced by the size of the smaller color bin 618(b). The next iteration of the Hausdorff distance calculation may then be performed upon the resultant new histogram comparison pair. In certain embodiments, the initially-calculated Hausdorff distances may be multiplied by the relative proportional sizes of the smaller bins. In accordance with the present invention, feature detector 218 may then combine the various iterations of the Hausdorff distance 320 into a distance measure 324 that represents all the iterations.

Figure 7:
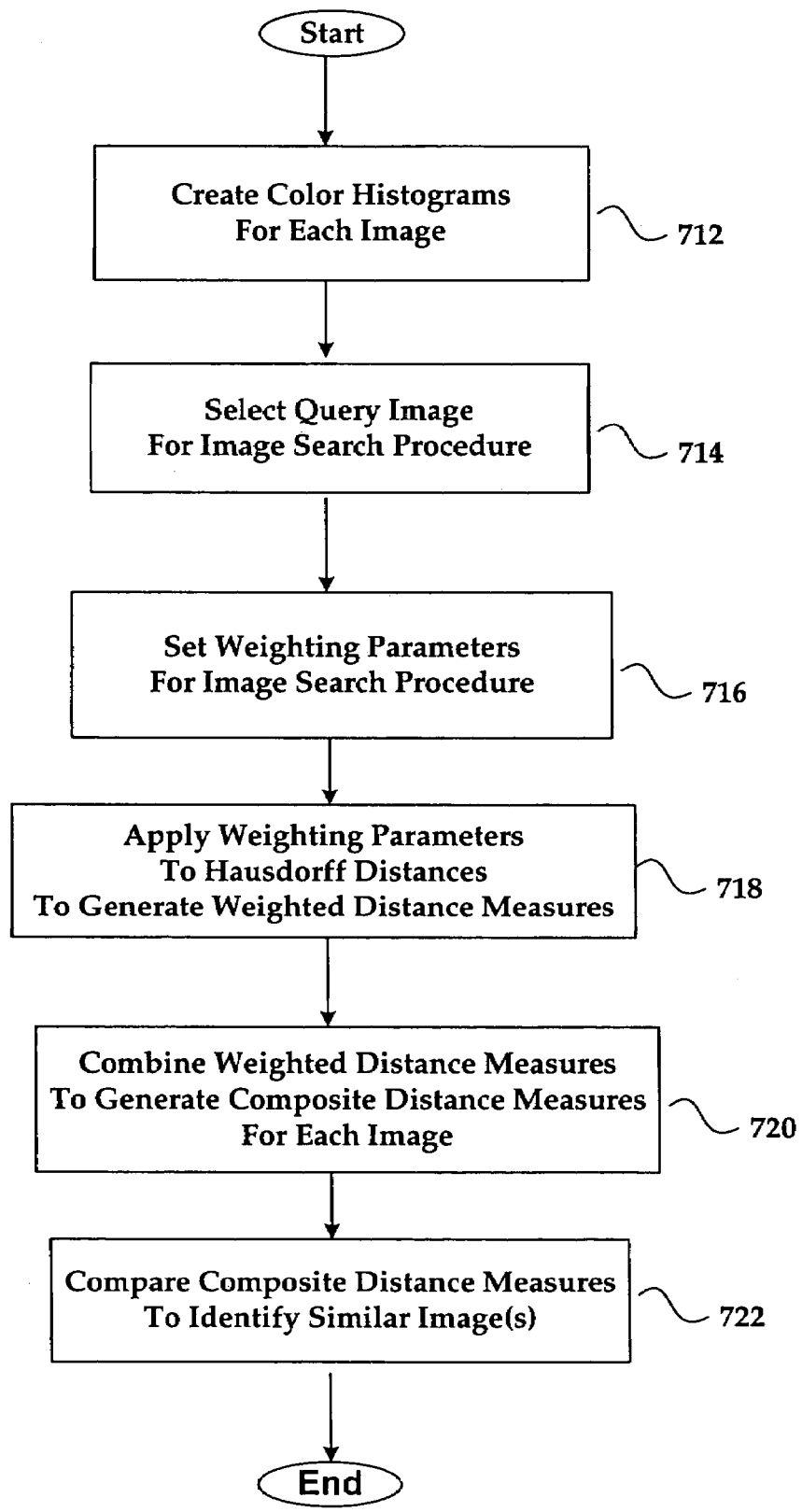
FIG. 7 is a flowchart of method steps for utilizing a graphic equalizer in performing an image search procedure, in accordance with one embodiment of the present invention.

Referring now to FIG. 7, a flowchart of method steps for utilizing a graphic equalizer 514 (FIG. 5) in performing an image search procedure is shown, in accordance with one embodiment of the present invention. The FIG. 7 example is presented for purposes of illustration, and, in alternate embodiments, the present invention may readily utilize steps and sequences other than certain of those discussed in conjunction with the FIG. 7 embodiment.

In the FIG. 7 embodiment, in step 712, a histogram calculator 220 of a computer device 110 initially creates a set of color histograms 312 for each image of saved image data 216. In certain embodiments, the color histograms 312 include a fine-detail histogram 312(a), a medium-fine detail histogram 312(b), a medium-coarse histogram 312(c), and a coarse detail histogram 312(d).

Next, in step 714, a system user or other appropriate entity selects a query image from image data 216 for performing an image search procedure to identify one or more other similar subject images from image data 216. In step 716, a graphic equalizer 514 is utilized to set weighting parameters 316 corresponding to each type of color histogram 312 for performing the image search procedure. The foregoing weighting parameters 316 may be selected automatically depending upon predetermined search criteria, or may be selected manually by the system user or other appropriate entity.

In step 718, a feature detector 218 of the computer device 110 applies the foregoing weighting parameters 316 to calculated Hausdorff distances for each of the types of color histograms 312 to generate corresponding weighted distance measures, as discussed above in conjunction with FIGS. 4 through 6B. Then, in step 720, feature detector 218 combines the weighted distance measures to generate composite distance measures 329 that each correspond to a respective one of the subject images from image data 216. Finally, in step 722, feature detector 218 may compare the calculated composite distance measures 328 to identify one or more images from image data 216 that are most similar to the selected query image of the image search procedure. For at least the foregoing reasons, the present invention provides an improved system and method for utilizing a graphic equalizer 514 in performing image search procedures.

Figure 8A:
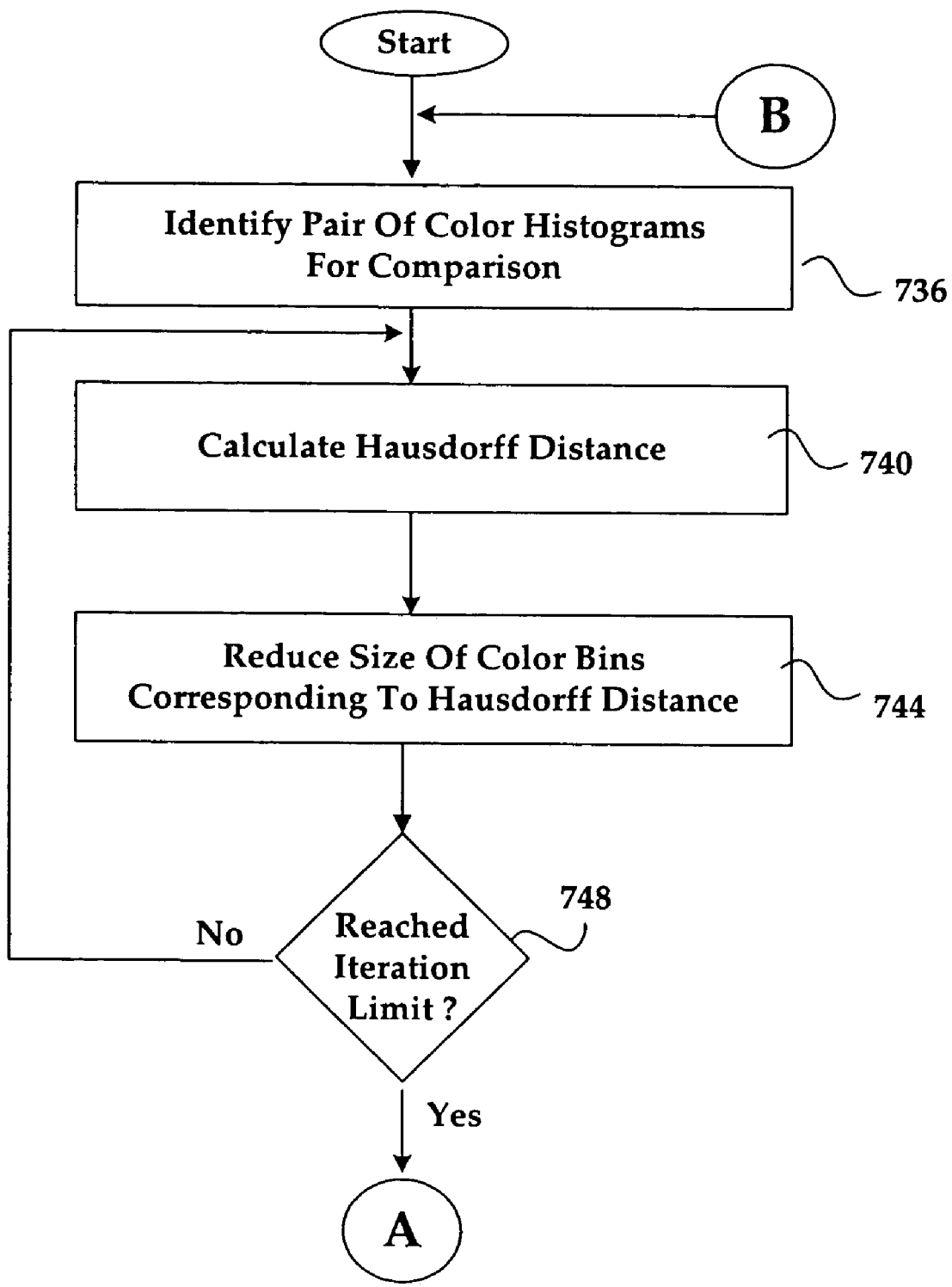
FIGS. 8A and 8B are a flowchart of method steps for calculating a composite distance measure, in accordance with one embodiment of the present invention.
Figure 8B:
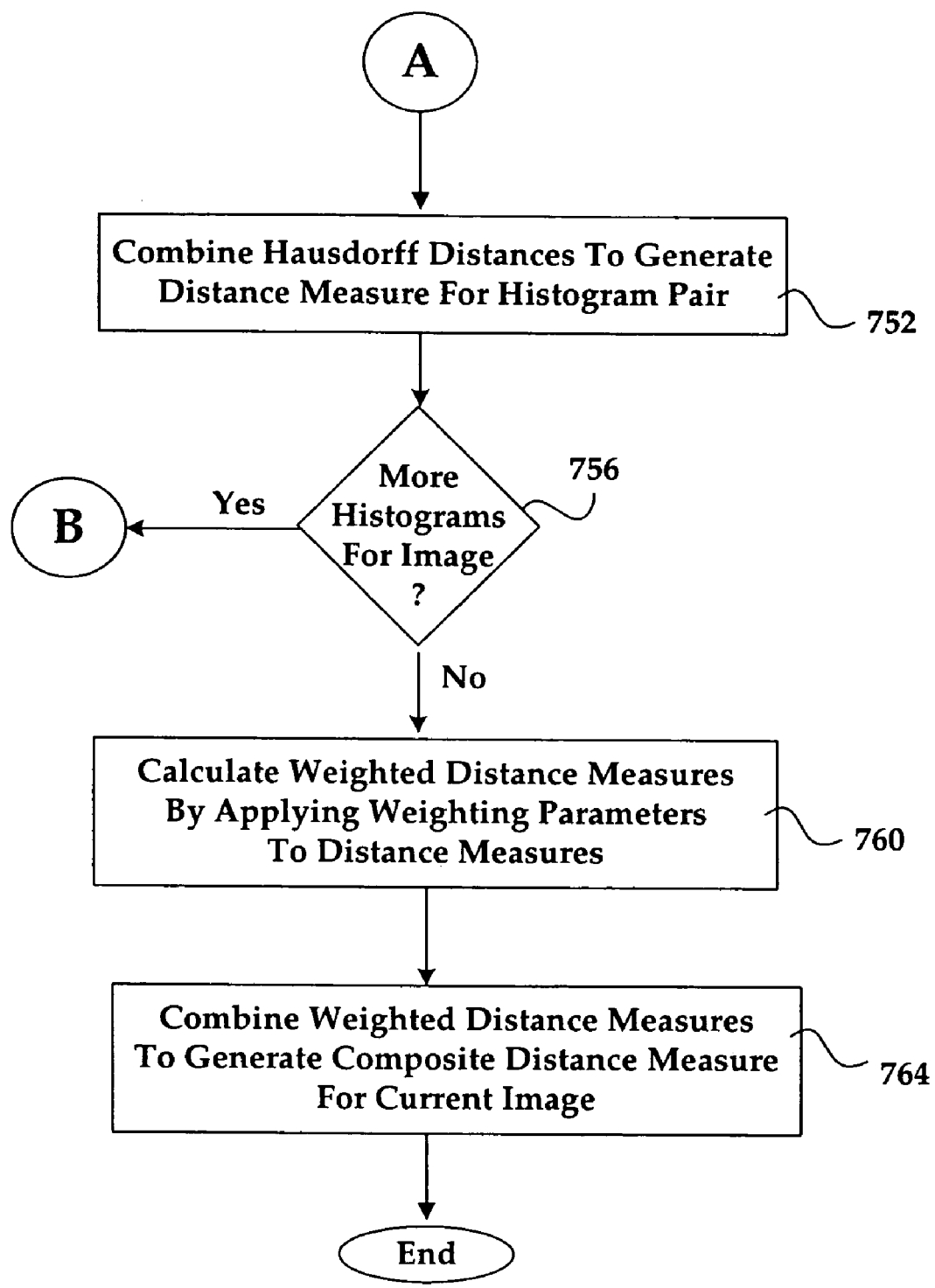

Referring now to FIGS. 8A and 8B, a flowchart of method steps is shown for calculating a composite distance measure 328 for a given pair of images 216, in accordance with one embodiment of the present invention. In certain embodiments, the flowchart of FIGS. 8A and 8B corresponds to steps 718 and 720 of the FIG. 7 embodiment. The example of FIGS. 8A and 8B is presented for purposes of illustration, and, in alternate embodiments, the present invention may readily utilize steps and sequences other than certain of those discussed in conjunction with the embodiment of FIGS. 8A and 8B.

In the FIG. 8A embodiment, in step 736, a feature detector 218 or other appropriate entity initially identifies a pair of corresponding color histograms 312 (histogram comparison pair) for comparing in order to calculate a distance measure 324. The histogram comparison pair typically have the same number of bins, and represent a query image and one of the other subject images for the image search procedure. In step 740, feature detector 218 calculates a Hausdorff distance 320 for the histogram comparison pair, as discussed above in conjunction with FIGS. 4 through 6B.

In step 744, feature detector 218 reduces the size of the two bins corresponding to the current Hausdorff distance 320 by the size of the smaller of the two bins. Then, in step 748, feature detector 218 determines whether a predetermined iteration limit has been reached. If the predetermined iteration limit has not been reached, then the FIG. 8A process returns to step 740 to calculate another iteration of the Hausdorff distance 320 with the altered histogram comparison pair.

However, if the predetermined iteration limit has been reached, then the FIG. 8A process advances to step 752 of FIG. 8B through node A. In step 752, feature detector 218 combines the previously calculated Hausdorff distances 320 for the current histogram comparison pair to generate a distance measure 324 for that histogram comparison pair. In step 756, feature detector 218 determines whether more histogram comparison pairs remain for the current subject image. If more histogram comparison pairs remain, then the FIG. 8B process returns to step 736 of FIG. 8A via node B.

However, if no histogram comparison pairs remain for the current images, then in step 760, feature detector 218 calculates weighted distance measures by applying selected weighting parameters 316 from a graphic equalizer 514 to the foregoing distance measures 324. Finally, in step 764, feature detector 218 combines the weighted distance measures for the various histogram comparison pairs to generate a composite distance measure 328 for the current subject image 216.

The invention has been explained above with reference to certain embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for performing an image search procedure with an electronic device, comprising:
    a histogram calculator for creating sets of histograms that represent images, each of said sets including a plurality of said histograms that each have a different level of detail;
    a graphic equalizer configured to select weighting parameters for performing said image search procedure; and
    a feature detector that calculates distance measures between histogram comparison pairs of a query image and subject images, said feature detector applying said weighting parameters to said distance measures to produce weighted distance measures, said feature detector combining said weighted distance measures from said histogram comparison pairs to produce a composite distance measure for each of said subject images, said feature detector identifying one or more of said subject images that are similar to said query image by analyzing said composite distance measures.

2. The system of claim 1 wherein said histograms are color histograms that represent color characteristics of said images.

3. The system of claim 1 wherein said different level of detail is proportional to a total number of histograms bins.

4. The system of claim 1 wherein each of said sets of said histograms corresponds to a different one of said images, said sets of said histograms each including a fine-detail histogram, a medium-fine detail histogram, a medium-coarse detail histogram, and a coarse-detail histogram.

5. The system of claim 4 wherein said fine-detail histogram has sixty-four bins, said medium-fine detail histogram has thirty-two bins, said medium-coarse detail histogram has sixteen bins, and said coarse-detail histogram has eight bins.

6. The system of claim 1 wherein a system user views said graphic equalizer on a graphical user interface of said electronic device to manually select said weighting measures.

7. The system of claim 1 wherein said graphic equalizer is automatically controlled for setting said weighting measures according to predetermined image searching criteria.

8. The system of claim 1 wherein said distance measures are determined by performing a Hausdorff distance calculation procedure.

9. The system of claim 8 wherein said Hausdorff distance calculation procedure quantifies dissimilar characteristics of said histogram comparison pairs.

10. The system of claim 8 wherein a single iteration of said Hausdorff distance calculation procedure is performed for fine-detail histogram pairs, two iterations of said Hausdorff distance calculation procedure are performed for medium-fine detail histogram pairs, four iterations of said Hausdorff distance calculation procedure are performed for medium-coarse detail histogram pairs, and fourteen iterations of said Hausdorff distance calculation procedure are performed for coarse-detail histogram pairs.

11. The system of claim 10 wherein said fourteen iterations of said Hausdorff distance calculation procedure equals an Earth Mover's Distance for said coarse-detail histogram pairs.

12. The system of claim 11 wherein said Earth Mover's Distance quantifies similar characteristics of said coarse-detail histogram comparison pairs.

13. The system of claim 1 wherein said feature detector calculates one of said composite distance measures by initially identifying a first set of said histograms belonging to said query image and a second set of said histograms belonging to one of said subject images, said feature detector then identifying a first one of said histogram comparison pairs from said first set and said second set that have a same level of detail.

14. The system of claim 13 wherein said feature detector calculates a first Hausdorff distance for said first one of said histogram comparison pairs.

15. The system of claim 14 wherein said feature detector performs a histogram reduction procedure to reduce two bins corresponding to said first Hausdorff distance by a size of a smaller of said two bins.

16. The system of claim 15 wherein said feature detector performs additional iterations of said Hausdorff distance and said histogram reduction procedure until a predefined iteration limit has been reached, said predefined iteration limit being proportional to said different level of detail of said first one of said histogram comparison pairs.

17. The system of claim 16 wherein said feature detector combines said first Hausdorff distance and said additional iterations of said Hausdorff distance to produce a first distance measure for said first of said histogram comparison pairs, said feature detector then performing a similar procedure for three remaining ones of said histogram comparison pairs from said first set of said histograms and said second set of said histograms to generate a second distance measure, a third distance measure, and a fourth distance measure.

18. The system of claim 17 wherein said feature detector applies said weighting parameters to corresponding ones of said first distance measure, said second distance measure, said third distance measure, and said fourth distance measure to produce said weighted distance measures, said feature detector then combining said weighted distance measures to generate said one of said composite distance measures.

19. A method for performing an image search procedure with an electronic device, comprising the steps of:
creating sets of histograms that represent images, each of said sets including a plurality of said histograms that each have a different level of detail;
selecting weighting parameters for performing said image search procedure;
calculating distance measures between histogram comparison pairs of a query image and subject images;
applying said weighting parameters to said distance measures to produce weighted distance measures;
combining said weighted distance measures from said histogram comparison pairs to produce a composite distance measure for each of said subject images; and
identifying one or more of said subject images that are similar to said query image by analyzing said composite distance measures.

20. A system for performing an image search procedure with an electronic device, comprising:
a histogram calculator for creating sets of histograms that represent images;
a graphic equalizer configured to select weighting parameters for performing said image search procedure; and
a feature detector that calculates distance measures between histogram comparison pairs of a query image and subject images, said feature detector applying said weighting parameters to said distance measures to produce weighted distance measures, said feature detector combining said weighted distance measures from said histogram comparison pairs to produce a composite distance measure for each of said subject images.

* * * * *